No. 682,937. Patented Sept. 17, 1901.
B. HUGHES.
MACHINE FOR MAKING WOODEN DISHES.
(Application filed Dec. 28, 1900.)
(No Model.) 3 Sheets—Sheet 1.
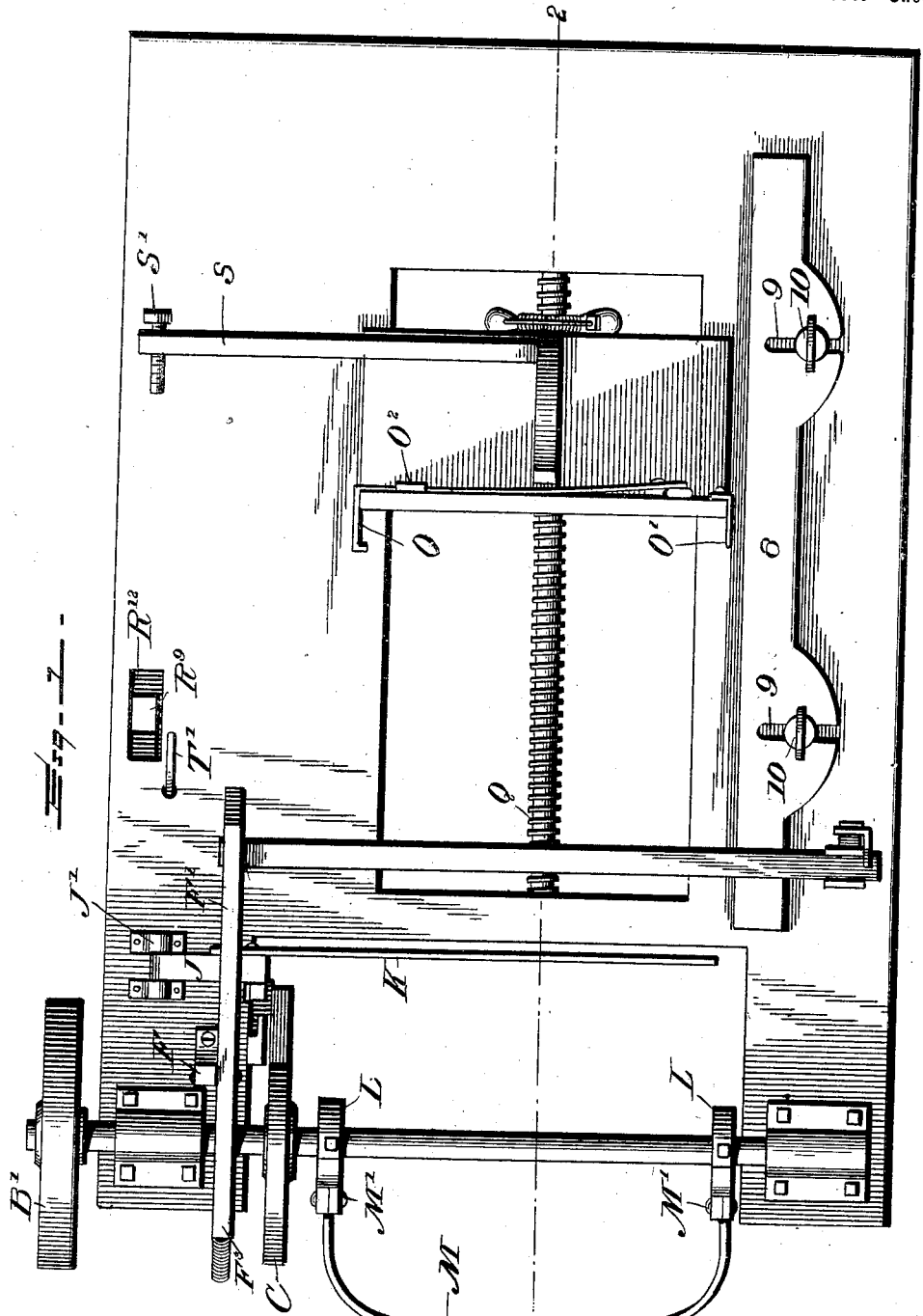
WITNESSES:
INVENTOR
B. Hughes,
BY Franklin N. Hough
Attorney

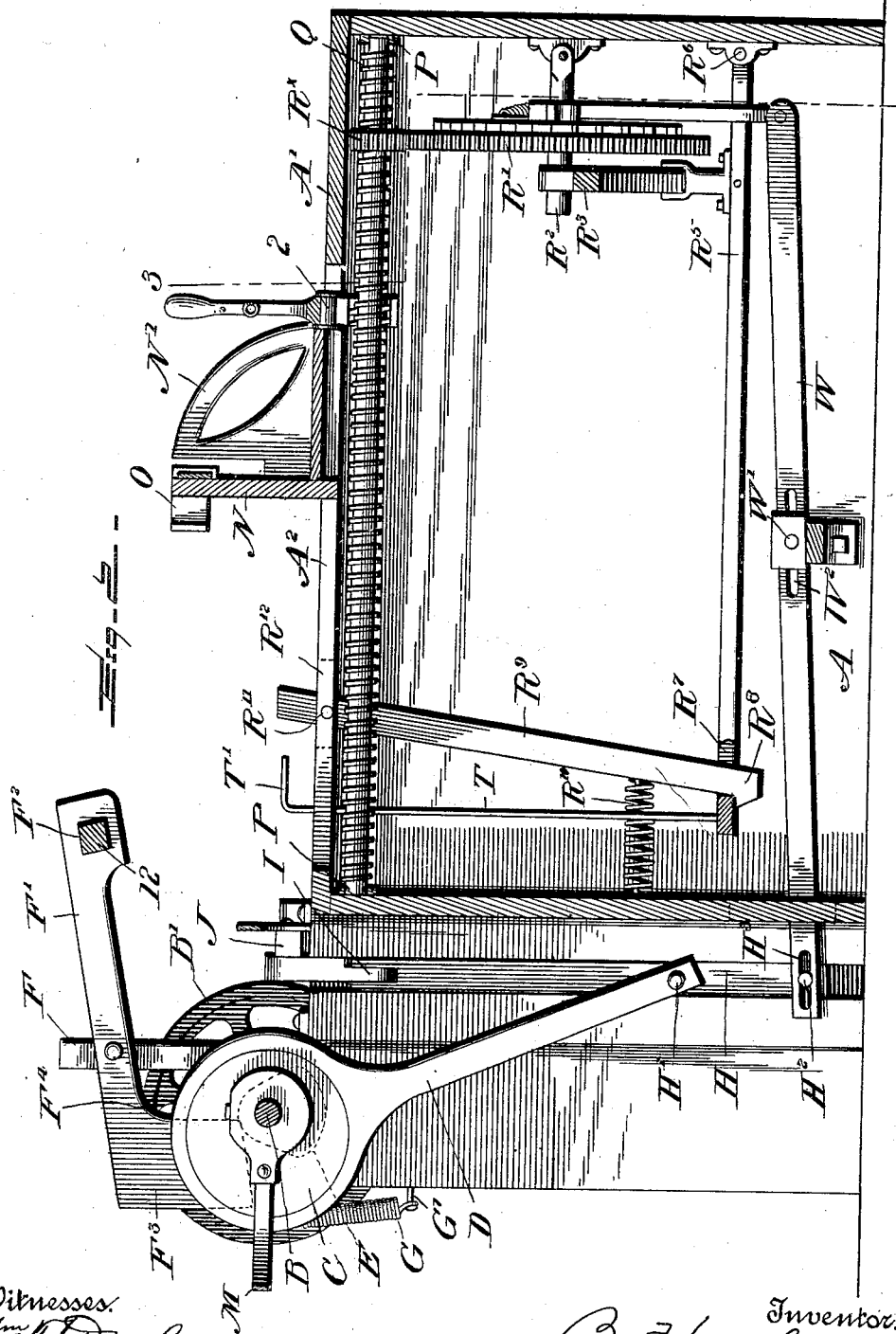

No. 682,937. Patented Sept. 17, 1901.
B. HUGHES.
MACHINE FOR MAKING WOODEN DISHES.
(Application filed Dec. 28, 1900.)
(No Model.) 3 Sheets—Sheet 3.
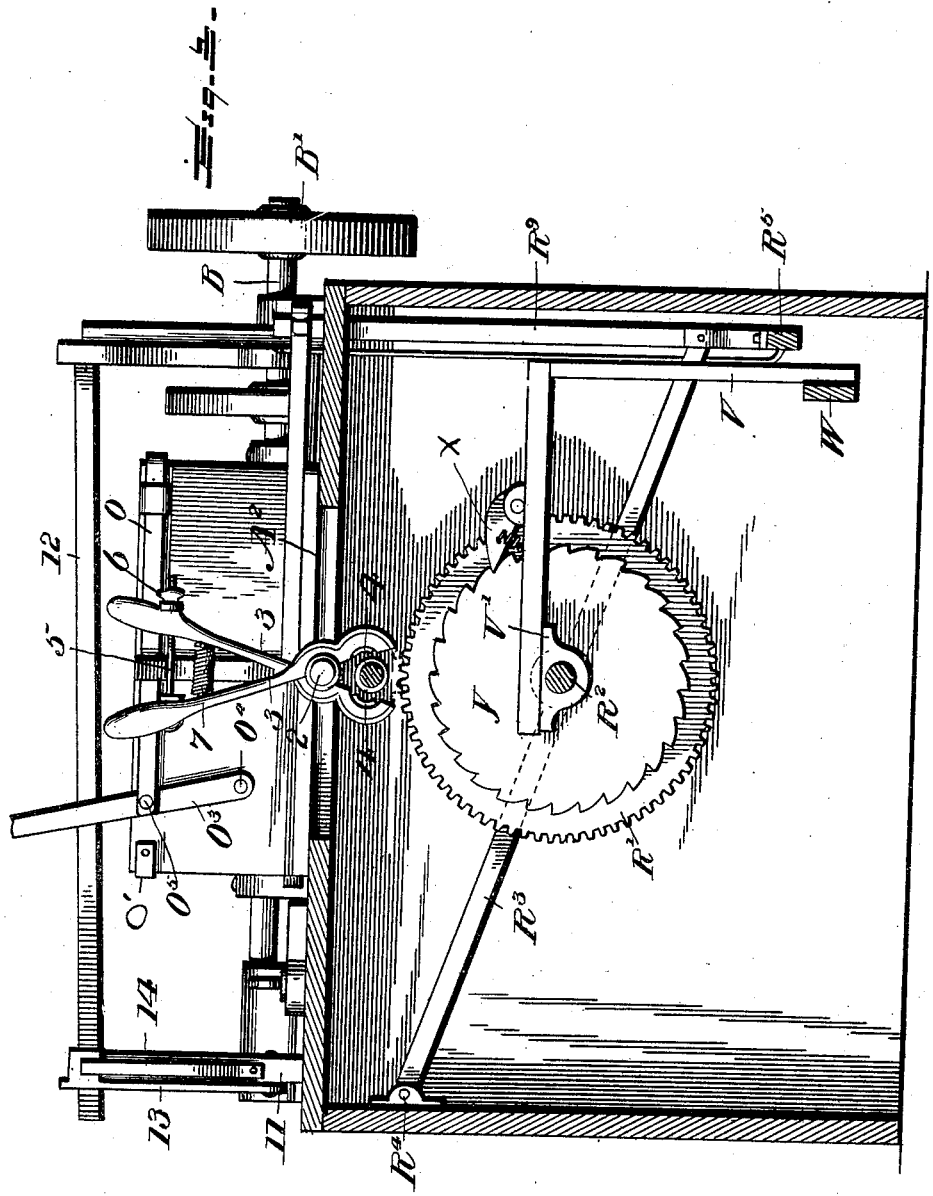

UNITED STATES PATENT OFFICE.

BERT HUGHES, OF HARRISVILLE, NEW YORK.

MACHINE FOR MAKING WOODEN DISHES.

SPECIFICATION forming part of Letters Patent No. 682,937, dated September 17, 1901.

Application filed December 28, 1900. Serial No. 41,396. (No model.)

*To all whom it may concern:*

Be it known that I, BERT HUGHES, a citizen of the United States, residing at Harrisville, in the county of Lewis and State of New York, have invented certain new and useful Improvements in Machines for Making Wooden Dishes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in machines for making wooden dishes; and it consists in the provision of mechanism for securely holding a block and feeding the same forward automatically in the path of a rotary knife which is designed especially to cut a plate having rounded sides and flat bottom, means being provided to securely hold the free edge of the block while the plate is being cut and means for automatically relieving the free edge of the block of pressure while the latter is being fed forward. Other features of the invention reside in the provision of means for automatically stopping the speed of the block and of mechanism for throwing the machine into and out of gear.

The invention is clearly illustrated in the accompanying drawings, which, with the letters and figures of reference marked thereon, form part of this application, and in which drawings similar characters of reference indicate like parts throughout the several views, in which—

Figure 1 is a top plan view of my machine for cutting dishes. Fig. 2 is a central longitudinal section on line 2 2 of Fig. 1, and Fig. 3 is a cross-sectional view on line 3 3 of Fig. 2.

Reference now being had to the details of the drawings by letter, A designates the frame of the machine, having a table A', which is longitudinally recessed, as at $A^2$. Mounted in said frame is a shaft B, which is journaled in suitable bearings and has mounted to rotate therewith a driving-pulley B', to which power from any source may be applied. Said shaft carries a cam C, having a pitman D, with its enlarged apertured end fitted over and adapted to ride upon the circumference of said cam. Mounted upon said shaft is a second cam E, and pivoted to the upright F of the frame is a lever F', which has an aperture $F^2$ at one end and its other end secured to a spring G, which spring is fastened at its opposite end to the frame, as at G'. The end of said lever to which the spring is attached has an enlarged portion $F^3$, and the under edge of the lever is scalloped, as shown at $F^4$. This enlarged portion of the lever F is disposed in the path of the cam E, whereby at each revolution of the shaft B said enlarged end of the lever F is designed to tilt up, while the free end of the lever, having the aperture $F^2$ therein, is dipped down at each revolution of the shaft carrying said cam.

Mounted in a vertical guideway in the frame is a slide H, to which the lower end of the pitman D is pivoted, as at H', and to the upper end of said slide H, which is bifurcated, is pivoted a link I, which in turn is pivoted to a second link J, said link J being pivoted to a portion of the framework of the machine at J', Fig. 1 of the drawings. To said link J is secured one end of the paring-knife K. (Shown in top elevation in Fig. 1 and in cross-section in Fig. 2 of the drawings.)

Secured to the operating-shaft in any suitable manner are the knife-carrying socket-pieces L, which are slotted on their inner faces, in which slots the ends of the knife M are received and securely held by means of screws M' or other suitable fastening, as may be desired. This knife M is usually of the shape shown in the drawings, in which there appears a substantially straight portion terminating in rather abrupt curves at its ends for the purpose of cutting a dish which shall have rounded ends with flat bottom. The portion of the frame of the machine between the journal-boxes in which the operating-shaft is mounted is cut away, so as to allow the knife to rotate in contact with the end of the block of wood from which dishes are to be cut.

The carriage-holding block is designated in the drawings by the letter N and is mounted to travel in the slotted portion $A^2$ of the table of the machine. Said carriage is provided with a suitable handle N' and a clamping mechanism consisting of two angle-arms O and O', the former of which, O, is longitudinally adjustable and slides in a suitable bracket $O^2$, while the bracket O' is fixedly held to the end of the upright portion of the carriage. A handle $O^3$ is pivoted to the upright portion of the carriage at $O^4$ and has pivoted thereto at $O^5$ one end of said longitudinally-adjustable clamping member O. The block of wood from which the dishes are to be cut is placed between said clamping members and against the upright portion of the carriage, and by manipulating the lever $O^3$ the clamping member secured thereto may be brought against the end of the block and securely hold the same to the carriage.

Mounted underneath the table of the machine and in bearings P on the end walls of the frame is a worm-shaft Q, and mounted on said worm-shaft is a gear-wheel R, which when the mechanism is thrown into operative connection is in mesh with a gear-wheel R', which is mounted upon and rotates with a shaft $R^2$, which shaft is mounted upon the pivoted lever $R^3$. Said lever $R^3$ is pivoted at its upper end to a plate $R^4$, secured to the inner face of the siding of the frame, and its lower end is pivoted to the tilting lever $R^5$. Said lever $R^5$ is pivoted to the frame at $R^6$ and its opposite end is apertured, as at $R^7$, to receive the lower hooked end $R^8$ of the lever $R^9$. In order to hold said lever R in a position to normally engage and hold the forward free end of the lever $R^5$ in the position shown in Fig. 2 of the drawings, a spring $R^{10}$ is employed, one end of which is secured to said lever $R^9$ and its other end to the frame of the machine. The upper portion of the lever $R^9$ is pivoted at $R^{11}$ to the frame and in an aperture $R^{12}$ in the table thereof, and the end of said lever $R^9$ projects a slight distance above the table, as shown clearly in Fig. 2 of the drawings. This projecting end of the lever $R^9$ is provided as a stop, against which a set-screw S', carried at the outer end of the arm S, mounted on the carriage, is adapted to strike as the carriage is fed forward to its farthest limit. In order to raise the lever $R^5$ to the position shown in Fig. 2 of the drawings after the carriage has been forwarded and the lever $R^9$ tilted to lower the bar $R^5$, and consequently throw the machine out of gear, I provide a rod T, the lower end of which is secured to the lever $R^5$, and said rod projects through the table of the machine and is bent at an angle, so as to form a handle T', whereby said rod may be raised, also with it the lever $R^5$, and as the latter is raised to a horizontal position the lower hooked end of the lever $R^9$ will automatically catch under the edge of the aperture in the rod $R^5$ and hold the latter in the position shown in Fig. 2 of the drawings.

W is a lever which is pivoted at W' near its center and is provided with an elongated slot $W^2$, whereby said lever may be longitudinally adjusted, and to one end of said lever W is adjustably connected the lower end of the slide H by means of a pin $H^2$, passing through an elongated slot $H^3$ in the end of the lever W. The opposite end of the lever W has pivotal connection with the pawl-carrying arm V, one end of which rack is mounted upon a bearing V', which is journaled on the shaft $R^2$, said rack, which is angled, having pivoted thereto a spring-actuated pawl X, which is normally held in engagement with the teeth of the ratchet-wheel Y, which is secured to and rotates with the gear-wheel R. By means of these connections it will be observed that as the slide H is raised and lowered in the grooved portion of the frame at each revolution of the shaft having pitman connection with said slide the lever W will be tilted upon its axis and the pawl-carrying arm V raised and lowered. As the rack is lowered the dog will ride idly over a ratchet-tooth on the wheel Y, and when the arm is raised by the tilting of the lever W the ratchet and gear wheels Y and R' will be partially rotated, and if the pinion-wheel $R^X$ is in mesh with the gear-wheel R' the worm-shaft will be partially rotated.

Mounted upon a pin 2, secured to the rear of the carriage, are the jaws 3, the lower portions of which on their adjacent edges are recessed and provided with threads 4, which are designed to engage and form a clutch over the threads of the worm-shaft when it is desired to have the carriage fed forward with the rotation of the worm-shaft. A threaded rod 5 is secured to one of said arms 3, and its other end, which is threaded, passes through an aperture in the other arm 3, and by means of a winged nut 6, mounted on said threaded rod, said arms 3 may be held so that the threaded recess in the lower ends thereof will be held in engagement with the thread of the worm. A spring 7, which is fastened at its ends to the inner adjacent faces of said arms, is provided to normally hold the arms so that their lower ends will be out of engagement with the worm-shaft.

Mounted on the table is an adjustable plate 8, which has slots 9 therein, and winged adjusting-screws 10 are passed through said slots and engage the table for the purpose of holding said plate 8 in any adjusted position. This plate is provided as means to hold and steady the free end of the block as a plate is being cut from the block as it is fed forward.

Mounted upon the table is a post 11, which is recessed at its upper end to receive one end of the bar 12, the other end of said bar being adapted to be held in the recess in the end of the lever F', as shown in Fig. 2 of the drawings. In order to hold the end of the bar 12 in the recess in said post 11, I provide a pivoted arm 13, which is held against the end of the bar 12 by means of a spring 14, which is secured to said post 11.

The operation of my machine is as follows, viz: The block from which the plates are to be cut first being clamped to the carriage, the machine is set in motion, power being applied to the driving-shaft in any suitable manner. The rotary knife M, coming in contact with the edge of the block, will cut out a plate which, owing to the shape of the knife, will have curved sides and a flat or substantially flat bottom. Before the rotary knife strikes the block, however, the cam E, mounted on the shaft B, will have tilted the lever F', so that the bar 12, carried at the end of said arm, will be forced down upon the free edge of the block in order to hold the same securely while the dish is being cut. After the rotary knife cuts the dish the knife K is thrown down by means of its pivotal connections with the pitman and slide, and the edge of the block is trimmed off preparatory to the cutting of a second dish. At each revolution of the operating-shaft the dog which is mounted to engage the teeth of the ratchet-wheel imparts a partial revolution to the worm-shaft through the connections described, and the carriage carrying the block will be driven forward a sufficient distance so that the rotary knife will cut the second dish. This intermittent motion is imparted to the carriage at each revolution of the shaft, and when the carriage is fed forward to its farthest limit the set-screw S', mounted on the arm S, secured to the carriage, will contact with the upper end of the tilting lever R⁹, which will cause the lower end of the same to be thrown backward and allow the lever R⁵, upon which the shaft and gear-wheel R' is mounted, to drop sufficiently to throw the gear-wheels R' and R× out of mesh, which will cause the carriage to remain stationary during the further rotations of the operating-shaft. When it is desired to return the carriage to its starting position, the clutch-arms are manipulated so as to disengage their lower ends from the worm-shaft, and the carriage may be pushed back to its starting position, after which the gear-wheels R' and R× may be thrown into mesh by pulling upon the angle-rod T', which will cause the lower end of the lever R⁹ to engage and hold the lever R⁵ in a substantially horizontal position, as shown in Fig. 2 of the drawings.

In the operation of my machine it will be observed that the free edge of the block is engaged and pressure applied thereto only during the cutting operation as the rotary knife swings toward the block. After the knife has cut the dish the spring G, which is secured to the end of the lever F', will throw the forward end of the lever, carrying the bar 12, off the upper edge of the block.

Having thus described my invention, what I claim to be new, and desire to secure by Letters Patent, is—

1. In a machine for cutting wooden dishes, comprising in combination with the frame, the operating-shaft having a cam, an eccentric mounted about said cam, the draw-head or slide having pivotal connection with the arm of the eccentric, the rocking knife, link connections between same and said slide or draw-head, a tilting lever having an enlarged end, a cam on the operating-shaft adapted at each revolution thereof to tilt said lever, the rotary knife mounted on the shaft, a stationary post on the table of the machine, a pressure-bar held at one end in said post, and its other end mounted in the end of said tilting lever, and the carriage, and means for imparting an intermittent motion thereto at each revolution of the operating-shaft, as shown and described.

2. In a machine for cutting wooden dishes, the combination with the operating-shaft, the rotary cutting-knife, the reciprocating draw-head and connections between the same and the operating-shaft, for driving said draw-head, the carriage, a worm-shaft mounted in the frame of the machine, and having clutch connections with the carriage, a gear-wheel mounted to rotate with said worm-shaft, a gear-wheel and stub-shaft on which the same is mounted, said stub-shaft being pivoted at one end to a portion of the frame, a pivoted lever on which the opposite end of said stub-shaft is mounted, and means for dropping the stub-shaft and gear-wheel carried thereby out of mesh with the gear-wheel on the worm-shaft when the carriage is fed forward to its farthest limit.

3. A machine for cutting wooden dishes, comprising a frame, an operating-shaft and rotary knife, a reciprocating draw-head and connections between same and the shaft, the carriage and worm-shaft, clutch connections between same and said carriage, a gear-wheel on the worm-shaft, a stub-shaft pivoted at one end, a gear-wheel mounted on said stub-shaft, and meshing with the gear on the worm-shaft, a pivoted lever in which the other end of said stub-shaft is mounted, a spring-actuated lever pivoted to the frame of the machine, the upper end of which lever projects above the table, and the lower end notched, and adapted to hold the lever carrying the outer end of the stub-shaft in a substantially horizontal relation, so that the gear-wheels will be in mesh with each other, and means carried by the carriage to trip against the upper projecting end of said spring-actuated lever.

4. In combination in a machine for cutting wooden dishes, the framework, the operating-shaft, the reciprocating draw-head, connections between same and the operating-shaft, the carriage, an arm carried by said carriage, and a set-screw at the end of said arm, the worm-shaft, a gear on said worm-shaft, a stub-shaft pivoted to the frame, a gear-wheel mounted on said stub-shaft, a lever pivoted at one end to the frame of the machine, and supporting the outer end of said stub-shaft, a pivoted spring-actuated lever, having its lower end hooked and adapted to engage and hold the lever carrying the outer end of the stub-shaft in a position so that said gear-wheels will be in mesh with each other, the upper end of said spring-actuated lever projecting above the table, and in the path of said set-screw, whereby as the set-screw contacts with said end, the lower hooked end will be disengaged from the stub-shaft-carrying lever to allow the gear-wheels to be disengaged.

5. In a machine for making wooden dishes, the combination with the framework, the operating-shaft, the cutting-knives, the carriage, the worm-shaft, a gear-wheel mounted to rotate with said worm-shaft, a stub-shaft pivoted at one end to the frame, a gear-wheel mounted on said stub-shaft, a horizontally-mounted lever pivoted at one end of the frame, and supporting the outer end of the stub-shaft, the forward end of said horizontally-mounted shaft being pivoted, a rod secured thereto, passing through the table of the machine, and bent at an angle, a spring-actuated lever having a hooked end normally engaging said aperture to hold the stub-shaft-carrying lever in a horizontal position, so that said gear-wheels will be in mesh, the upper end of the spring-actuated lever projecting above the table of the machine, an arm projecting laterally from the carriage and a set-screw in said arm designed to strike against said projecting portion of the spring-actuated arm to disengage its lower end from the horizontally-disposed lever, whereby the gear-wheels are disconnected, as set forth.

6. In combination with the framework, the driving-shaft, the cutting-knives, the worm-shaft, the gear-wheel mounted thereon, the carriage and clutch connections between the same and said worm-shaft, the gear-wheel mounted on said worm-shaft, the stub-shaft, the gear and ratchet wheels mounted thereon, the vertically-adjustable lever supporting the free end of said stub-shaft, the trip-bar $R^9$ for normally holding the gears in mesh, and means for tilting the trip-lever to throw the wheels out of mesh, a pawl, and an arm carrying same, and a tilting lever having pivotal connection with said arm, whereby at each revolution of the operating-shaft a partial rotary movement is imparted to the worm-shaft, as shown and described.

7. In a machine for cutting wooden dishes, the combination with the frame, the operating-shaft, cutting-knives, the worm-shaft, carriage and geared connections for operating said worm-shaft, a lever having pivotal connections near its center with the frame, an arm pivoted at one end of said lever, the opposite end of said lever having connections with the driving mechanism, a stub-shaft pivoted at one end to the frame, the gear and ratchet wheels carried by said stub-shaft, and means for raising and lowering said stub-shaft one end of said arm having a journal-bearing for said stub-shaft, and a dog carried by the arm and engaging the teeth of the ratchet-wheel, as shown and described.

In testimony whereof I affix my signature in presence of two witnesses.

BERT HUGHES.

Witnesses:
CHAS. LUTHER,
MARTIN LUTHER.